J. GALAMB.
TRANSMISSION AND LINING FOR THE BANDS THEREOF.
APPLICATION FILED AUG. 9, 1920.
1,424,893.
Patented Aug. 8, 1922.
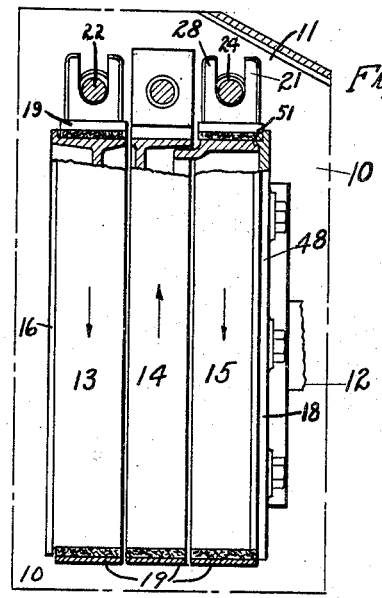
Fig. 1.
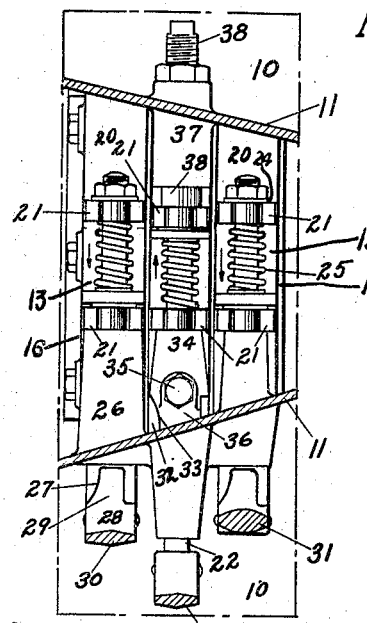
Fig. 2.
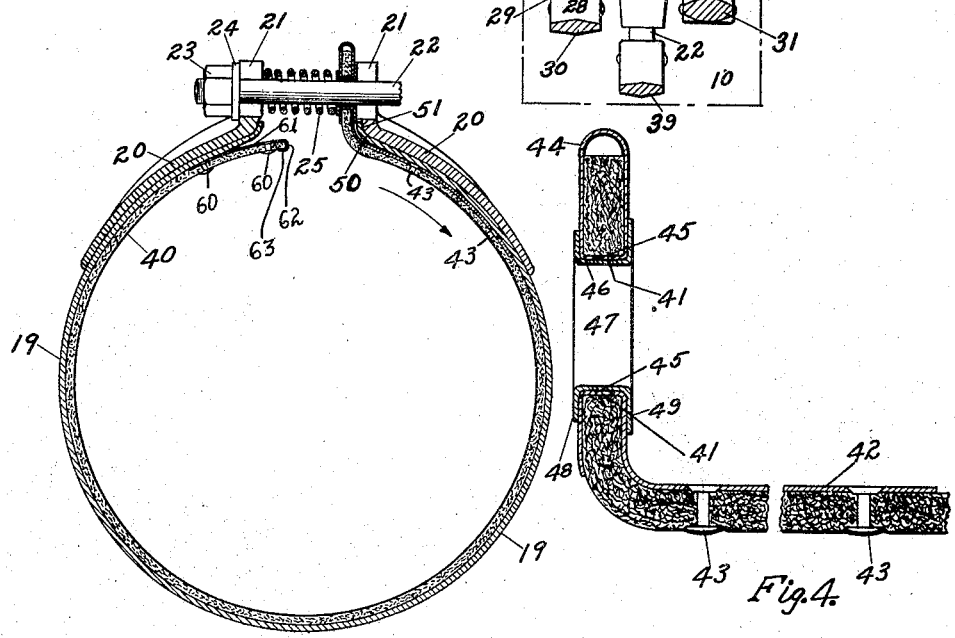
Fig. 3.
Fig. 4.
INVENTOR.
Joseph Galamb
BY J K Harness
ATTORNEY.

UNITED STATES PATENT OFFICE.

JOSEPH GALAMB, OF DETROIT, MICHIGAN, ASSIGNOR TO FORD MOTOR COMPANY, OF DETROIT, MICHIGAN, A CORPORATION OF DELAWARE.

TRANSMISSION AND LINING FOR THE BANDS THEREOF.

1,424,893.   Specification of Letters Patent.   Patented Aug. 8, 1922.

Application filed August 9, 1920. Serial No. 402,369.

*To all whom it may concern:*

Be it known that I, JOSEPH GALAMB, a citizen of the United States, residing at Detroit, in the county of Wayne and State of Michigan, have invented a new and useful Improvement in Transmission and Linings for the Bands Thereof, of which the following is a specification.

The object of my invention is to provide an improved lining for transmission bands of simple, durable and inexpensive construction.

A further object of my invention is to provide in connection with a transmission having a plurality of drums with bands therefor, linings for the bands which may be readily replaced, when they become worn, with comparatively little labor and expense.

A further object of my invention is to provide means for mounting the linings within the bands so that they may be held against movement caused by the rotation of the drums and, in combination with these mountings, means for reinforcing the linings and insuring a wear resisting connection at the mounting.

A further object of my invention is to provide means for detachably mounting the linings within the bands, which are so arranged that movement of the drum will tend to hold the lining within the band, and means on the bands or drums to hold the linings from lateral displacement.

With these and other objects in view, my invention consists in the arrangement, combination and construction of the various parts of my improved device, as described in the specification, claimed in my claims, and shown in the accompanying drawings in which:

Figure 1 is a central, sectional view through a transmission, parts being broken away to better illustrate the construction.

Figure 2 is a top or plan view of a portion of the transmission, the upper part of the housing being broken away to illustrate the transmission band connections.

Figure 3 is a central, sectional view through a brake band and lining which have been removed from the transmission, and Figure 4 is an enlarged vertical, longitudinal central, sectional view through one end of a lining.

Referring to the accompanying drawings, I have used the reference numeral 10 to indicate generally the round portion of the transmission housing above which are vertical walls 11 which form a well about the transmission parts to permit access thereto. Above these walls 11 is a cap member which is shown in section in Figure 1. Within the housing 10 on a central shaft 12 are aligned drums 13, 14 and 15 which have their edges disposed as closely together as will permit relative rotation of the drums. The outer drums 13 and 15 have ribs 16 and 18 at their outer edges for a purpose which will hereinafter be explained. In this connection it will be understood that the transmission upon which these drums are installed is so arranged that the drums 13, 14 and 15 rotate continuously whenever the motor is operating, and that when certain of these drums are held stationary, then that rotation will be imparted to the drive shaft 12 to drive any desired shaft, as for instance the drive shaft of an automobile. One of the drums also, as for instance the drum 15, is so arranged that it will hold the drive shaft from rotation when retarded. Retarding or stopping the various drums selectively may cause therefore the drive shaft to be driven in either direction or retarded. It will also be noted that the drums 13, 14 and 15 revolve in the directions indicated by the arrows in Figures 1 and 2 and that the drum 14 rotates normally in a direction opposite to the direction of rotation of the drums 13 and 15.

For holding these drums from rotation transmission bands are provided which comprise a resilient steel band 19 having at its ends forgings 20 which are secured to the ends of the bands to form a reinforcement for the bands and to form a support for the ears 21 which are preferably formed integral with the forgings 20. Each member 20 has a pair of these ears so that an operating shaft 22 may be extended through the notches between the pairs of ears to coact with the ears to draw them together, thereby tightening the band on the drum. A nut 23 is screwed onto the ends of the bolts or operating rods 22 for drums 13 and 15 adjacent to one end thereof to coact with the adjacent pair of ears 21 so that when the other pair of ears 21 is held from movement, then a longitudinal pull on the operating rod will contract the band as stated. A washer 24 may be disposed between nut 23 and the adjacent ears 21 if desired and means may also be provided to lock the nut 23 to the operating rod 22, although such locking means do not permit ready adjustment. Extended between the pairs of ears 21 of each band and encircling the operating rod 22 is a compressible coil spring 25 which is designed to normally, yieldingly hold the pair of ears separated and thereby normally, yieldingly hold the band in its expanded position.

Mounted in one of the walls 11 of the transmission housing is a bearing 26 which extends through that wall and which has its outer end notched at 27. The operating rod 22 of the band for the drum 13 extends through the bearing 26 and has a collar 28 fixed to the outer end thereof, which in turn has a cam face 29 at its inner end designed to enter the notch 27. A pedal or other operating lever for the operating rod 22 is indicated by the sectioning 30 in Figure 2 and is arranged to rotate the operating rod when moved.

From the description of the foregoing parts it will be seen that if a band 19 be installed around the drum 13 with the pair of ears adjacent to the bearing 26 abutting against the adjacent end of that bearing and with the other pair of ears yieldingly pressed against the nut 23 by the spring 25, then that swinging of the rod 22 by the lever 30 will cause the cam member 29 to rotate out of the notch 27, thereby moving the rod on lines parallel with its longitudinal axis and thereby in turn drawing together the pairs of ears 21 which in turn contracts the brake band 19. As soon as the pressure on the lever 30 is removed it will be seen that the pressure of the spring 25 will tend to retract the rod 22 thereby drawing the cam 29 back into the notch 27. A mounting and band similar in all respects to the mounting and band for the drum 13 is provided for the drum 15. For convenience I have given, however, the lever controlling the band for the drum 15 the reference numeral 31.

For controlling the band for the drum 14 the following mechanism is provided:

A bearing 32 is fixed into and extended through one wall 11 of the transmission and has a notch 33 therein at the inner end which is similar to the notch 27. The operating rod 22 has a sleeve 34 detachably fixed thereto by means of a cap screw 35. this sleeve 34 having a cam face 36 thereon which is similar to the cam 29 of the other operating devices.

In the wall 11 opposite the one in which the bearings 26 and 32 are formed, is a bearing 37 which is aligned with the bearing 32 but which is of sufficient size so that a plunger 38 may be threaded into it to form a stop for the pair of ears 21 adjacent thereto. If the controlling lever or pedal 39 for the rod 22 be rotated to rotate the rod 22 it will be seen that the sleeve 34 will be rotated to turn the cam 36 out of the notch 33 thereby causing the sleeve 34 to move longitudinally and to carry with it the adjacent ears 21. It will therefore be seen that the swinging of the pedals 30, 31 and 39 will cause a tightening of the bands 19 on the drums so that there will be a considerable wear upon the surface of the drums and bands and the possible tendency for slippage. The bands are therefore provided with linings 40 which are designed to prevent slippage and to eliminate this wear, these bands being formed of very heavy fabric which is especially constructed to withstand the heat of the friction and the wear. These parts however eventually wear out or for other reasons must be replaced and a considerable difficulty is experienced in the replacing of these linings. Moreover, the replacement of these linings has made it necessary to tear down a considerable portion of the transmission in order to remove the bands so that the linings could be removed therefrom.

My invention consists in the form of lining here used which makes it unnecessary to tear down the transmission for replacing the lining as this operation can be completed by merely removing or displacing somewhat the transmission band controls. In connection with such a demountable lining, my invention consists in means for supporting such a band at one point only to hold it from movement with the drum so that the movement of the drum may tend to hold the lining between the band and drum, and, in combination with such a mounting, beads or ribs formed at the sides of the drums to thereby prevent lateral displacement of the linings.

In this instance the lining shown comprises a strip of heavy, pliable material of substantially the width of the drums used and of a length equal to or slightly greater than the circumference of the drums. This band is, of course, of material adapted for the purpose, but that material forms no part of my invention except so far as it was used for the improved lining. This strip has an opening 41 therein adjacent to one end and is reinforced and supported by a resilient strip 42 which has one end riveted to the lining at 43. This strip covers the outer side of the lining adjacent to the perforated end and is then folded over that end at 44 so that it covers both faces of the lining strip adjacent to the ears 21. When the strip 42 is formed, openings 45 are formed therein in such position that they will be aligned with each other and with the opening 41 in the lining when the strip 42 is secured to the lining. The edges of these openings 45 are turned in at 46 to form a reinforcing for the opening 41. An eyelet 47 is set into the opening 41 for a further reinforcement and is provided with flanges 48 and 49 adjacent to the near and outer surfaces respectively of the lining. From the construction of the foregoing it will be seen that I have provided for the lining 40 a metallic facing on its outer surface adjacent to the band 19 and have provided around the opening 41 a reinforcing of very great strength in comparison with the weight of the parts used.

If now a lining 40 be installed within a band 19 by inserting a rod 22 through the opening 41 and placing the adjacent end of the lining between spring 25 and the adjacent ears 21 it will be seen that the lining may extend around the inside of the band so that rotation of a drum within the band in the direction indicated by the arrow in Figure 3 will not affect materially the position of the lining within the band. This is due to the fact that the frictional engagement of such a rotating drum with the lining would simply cause a tension upon the opening 41 which could not, however, displace the band circumferentially due to the proximity of the adjacent surfaces of the drum and the band. Referring to Figures 1 and 2 it will be noted that I have placed the eyelet ends of the linings against the pair of ears of each of the bands toward which the adjacent surfaces of the corresponding drums are rotating. By this construction it will therefore be seen that the eyelet or opening 41 enables me to hold my linings from circumferential displacement relative to their corresponding drums in spite of the difference in direction of rotation of the different drums.

The practical operation of my improved device will be explained in connection with the replacement of worn or otherwise damaged linings, but it will be understood that the primary installation of the bands and linings may differ only from the replacement operation in that it will be unnecessary to remove the old linings.

If it be assumed that old linings 40 are to be removed from the transmission which will be assembled as illustrated in Figures 1 and 2, then the operating rods 22 are first removed from position between ears 21. This may be accomplished by removing the nuts 23 and drawing the rods 22 which are connected with the levers 30 and 31 out from between the ears 21 and the spring 25 to position where the end of the operating rods will be within the bearings 26. This movement of the operating rods will also withdraw them from the eyelets 47 so that the adjacent ends of the linings 40 may be grasped to pull the linings out from between the bands and the drums 13 and 15. New linings may then be put in by simply starting the end of the lining between the drum and band and continuing to push the lining between said drum and band until the end travels around the drum and the eyelet 47 is in position to be engaged by the rod 22, at which time the latter is again pushed between the ears 21.

It will be noted that the flanges 16 and 18 will prevent lateral movement of these bands when they are being pushed around the drum so that they will follow around the drum rather than crowding out from between the drum and the band. These flanges also act to keep the bands from such lateral displacement at all times.

The central rod 22 is drawn out from between the adjacent ears 21 by removing the cap screw 35 which permits the rod to slide out from the bushing 38 and through the sleeve 34 and bearing 32 so that the inner end thereof may be drawn out from between the ears 21 and the corresponding spring 25. The eyelet end of the lining is grasped to pull it out of the transmission when the rod 22 has been thus removed and a new lining pushed in in the same manner that the linings for the drums 13 and 15 are inserted. The operating rod 22 is then pushed back to position within the ears 21, the spring 25, and the bushing or the sleeve 38. The cap screw 35 may then be screwed back into place to lock the sleeve 34 and cam face 36 to the rod 22 so that rotation of the rod 22 may again operate the central band 19. At the end of the lining opposite the eyelet a facing strip 61 of comparatively resilient metal is secured to the outer surface of the lining by the rivets 60. This strip 61 is turned over the end of the lining at 62 and the turned over portion is again turned over the inner face of the lining at 63. The portion of the strip between the lining and band is extended along between these members to position spaced some distance from the end of the lining so that it may form a reinforcement at the point where the greatest wear occurs, and so that it may cause the adjacent portion of the lining to be resilient rather than pliable to thereby facilitate pushing the lining between the band and drum.

In connection with the installing of the lining it will be noted that the forging 20 is recessed at 50 just below the lower, inner face of the ears to receive the curved up end 51 of the band 19, thereby reducing to a minimum the possibility that the turning of the lining up past the inner face of the adjacent ears will cause the ears to contact with the lining so that it might cut through at that point. This rounding off has a further effect on facilitating the installation of new linings. The use of the strip 21 makes it easier to shove the lining in between the drum and band as it prevents the ends of the linings from fraying and also makes them more rigid than the body portion of the bands. In actual practice I have found that the use of this additional strip greatly facilitates the installation of the band as compared with the installing of a band which does not have this strip. Also, this strip acts as a reinforcement to prevent undue wear on the adjacent portion of the band.

The advantages of my improved device have been brought out during the course of this specification, but it may be especially pointed out that this device saves a considerable amount of time when the transmission linings must be replaced thereby adding appreciably to the usefulness of the machine and also it saves a partial tearing down of the transmission with the obvious advantages of such a saving. It also eliminates the tendency which such bands have to "chatter" where the linings are riveted or otherwise tightly secured to the band.

Some changes may be made in the arrangement and construction of the various parts of my improved device without departing from the spirit of the invention therein and it is my intention to cover by my claims such changes as may be reasonably included within the scope thereof.

I claim as my invention:

1. In a device of the class described, a detachable lining for brake bands comprising a strip of resilient flexible material adapted to be loosely received between a brake band and a drum, and means for detachably securing one end of the lining in position to prevent it from being drawn in between the band and the drum by the frictional contact with the rotating drum.

2. In a transmission having a plurality of drums, brake bands for each of said drums, linings comprising strips of pliable material loosely received between each of the brake bands and drums, and means for detachably supporting one end of each of said linings adjacent to the end of the corresponding band toward which the adjacent surface of the drum normally rotates.

3. In a transmission having a series of adjacent aligned drums, brake bands mounted to coact with each of said drums, linings comprising strips of pliable material loosely received between each drum and the corresponding band, means for supporting one end of each lining adjacent to the end of the band toward which the adjacent surface of the drum normally rotates, and means for holding said linings from lateral displacement.

4. In a transmission having a series of adjacent aligned drums, brake bands mounted to coact with each of said drums, linings comprising strips of pliable material loosely received between each drum and the corresponding band, means for supporting one end of each lining adjacent to the end of the band toward which the adjacent surface of the drum normally rotates, and a rib at the outer edge of the outer drums adapted to hold the bands from lateral displacement.

5. A lining for transmission bands adapted to be loosely received between a band and drum, comprising a strip of heavy fabric having flexibility and resiliency whereby one end thereof may be forced around a drum between the drum and band, and a strip of comparatively rigid reinforcing material secured to one end of the lining, said strip being also adapted to form one member of an attaching and supporting device.

6. A transmission band lining having one end equipped with retaining means for holding said lining in position on the transmission drum, and having reinforcing and stiffening means at the opposite end to prevent wear on the adjacent portion of the lining and to facilitate installation of the lining between the band and drum.

7. In a device of the class described, a detachable lining for brake bands comprising a strip of resilient flexible material adapted to be loosely received between a brake band and a drum, means for detachably securing one end of the lining in position to prevent it from being drawn in between the band and the drum by the frictional contact with the rotating drum, and means for stiffening and reinforcing the opposite end of the lining.

8. A lining for transmission bands comprising a strip of fabric adapted to be received between the band and drum of a transmission, means for forming a reinforced eyelet in one end of said strip, and means for reinforcing the opposite end to add to its resiliency and wearing qualities.

9. In a lining for a transmission band having ears at either end thereof, a rod extended through said ears, and a drum within said band, a strip of fabric loosely received between the band and drum to form a lining for the band, said fabric having an opening therein designed to receive the operating rod whereby said lining may be held from rotation with the drum by its engagement with the rod.

10. In a lining for transmissions having a contractible band, an operating rod therefor, and a drum received within the band and cooperating therewith, a strip of fabric loosely received between the band and drum, and means for securing one end of the fabric to the operating rod to thereby limit movement of the fabric with the drum.

JOSEPH GALAMB.